United States Patent [19]

Dyche

[11] 4,280,786
[45] Jul. 28, 1981

[54] FEED MECHANISM

[75] Inventor: Leslie Dyche, Birmingham, England

[73] Assignee: The Tool Production and Design Company Limited, Tamworth, England

[21] Appl. No.: 952,412

[22] Filed: Oct. 18, 1978

[51] Int. Cl.³ .................... B65G 15/00; B65G 65/00
[52] U.S. Cl. ............................... 414/749; 414/752; 271/104
[58] Field of Search .................. 414/749–752, 414/589, 121, 122, 117; 271/138, 137, 124, 121, 104, 167, 262, 263

[56] References Cited

U.S. PATENT DOCUMENTS

| | | | |
|---|---|---|---|
| 2,142,536 | 1/1939 | Smith | 271/104 |
| 2,941,738 | 6/1960 | Burke et al. | 414/749 |
| 3,411,636 | 11/1968 | Wallis | 414/750 |
| 3,430,782 | 3/1969 | Henkel | 414/750 |
| 3,620,380 | 11/1971 | Borodin | 414/749 |
| 3,648,854 | 3/1972 | Potter | 414/751 |
| 3,690,471 | 9/1972 | McConnell et al. | 414/752 |
| 3,912,317 | 10/1975 | Ohnaka | 414/752 |
| 3,982,635 | 9/1976 | Chin et al. | 414/749 |

FOREIGN PATENT DOCUMENTS

| | | |
|---|---|---|
| 1245190 | 9/1971 | United Kingdom . |
| 1246137 | 9/1971 | United Kingdom . |
| 1281988 | 7/1972 | United Kingdom . |
| 138560 | 2/1975 | United Kingdom . |

Primary Examiner—Leslie J. Paperner
Assistant Examiner—L. E. Williams
Attorney, Agent, or Firm—Ladas & Parry

[57] ABSTRACT

A feed mechanism for transferring workpieces from a loading station to an unloading station comprises a carrier which is arranged to grip the workpieces during their transference and a frame relative to which the carrier is horizontally movable to effect the transference. The carrier is also movable vertically relative to the frame so that it can be raised or lowered vertically into engagement with each workpiece at the loading station. A piston and cylinder assembly is operable to raise and lower the carrier, and is controlled by a cam follower which is movable onto and off a raised portion of a movable cam. A further piston and cylinder assembly moves the cam relative to the follower when the carrier reaches either end of its horizontal travel, and the movement of the cam can be limited to control whether the carrier is raised or lowered or both raised and lowered at each end of its horizontal travel.

9 Claims, 11 Drawing Figures

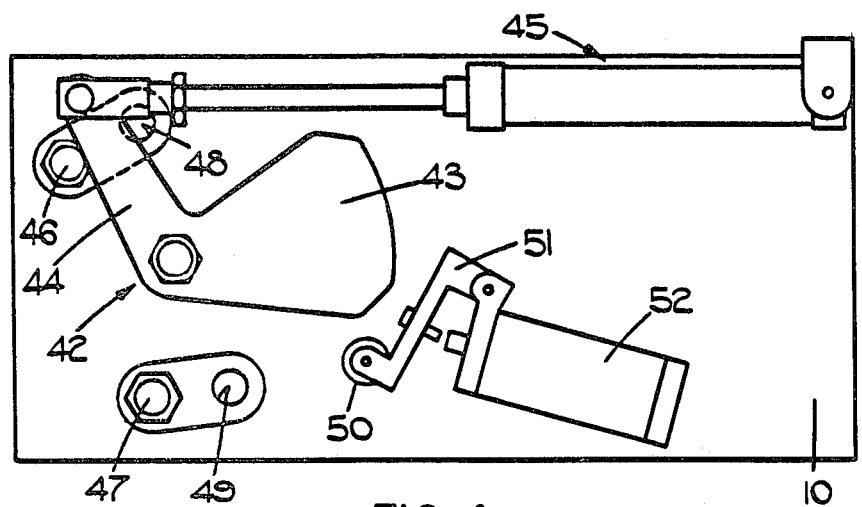
FIG. 4
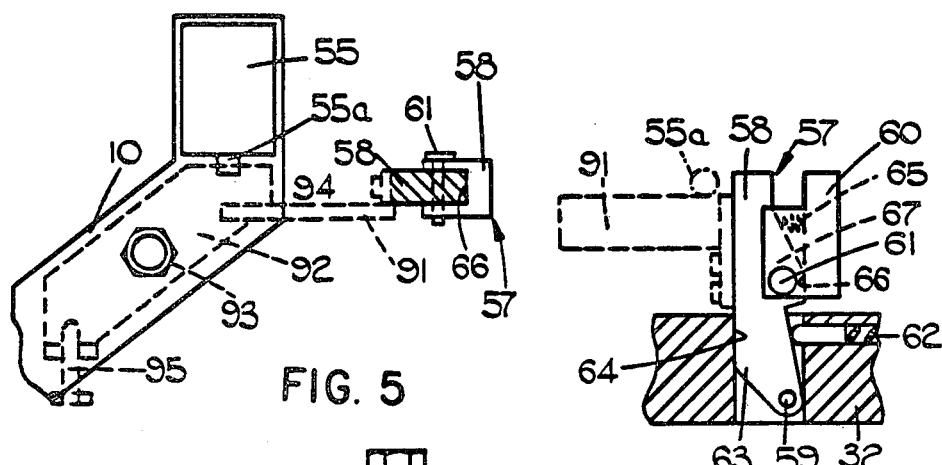
FIG. 5
FIG. 6
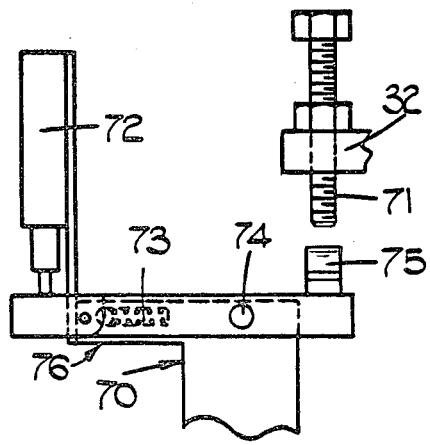
FIG. 7

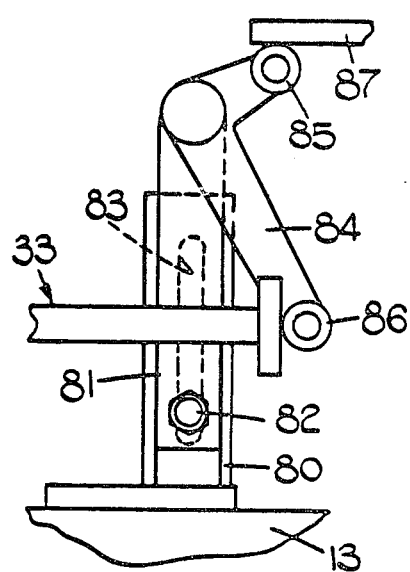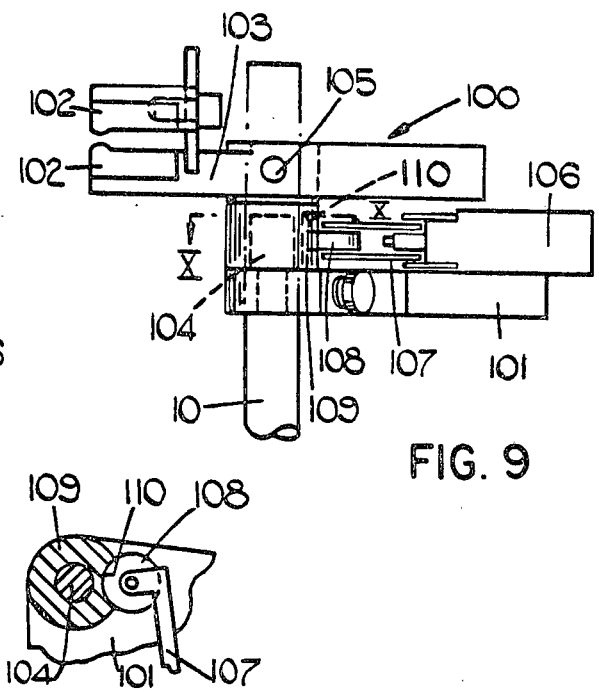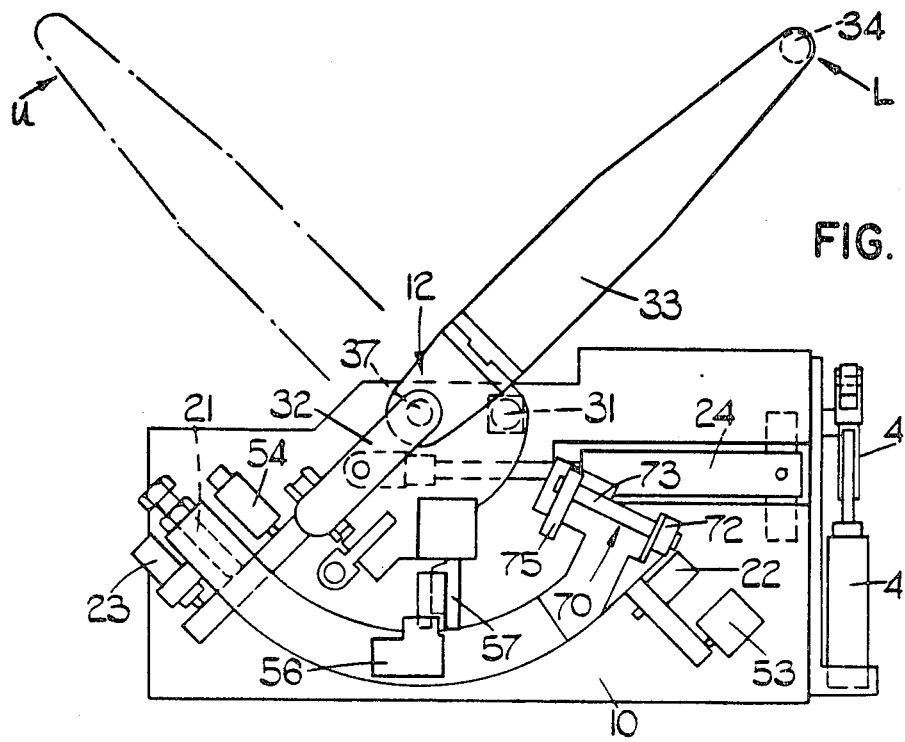

FEED MECHANISM

This invention relates to a feed mechanism for transferring workpieces from a loading station to an unloading station, of the kind comprising carrier means which is operable to grip a workpiece at the loading station and to support the workpiece during its transference to the unloading station.

It is often required that a feed mechanism of the above-described kind can be used to transfer workpieces singly from a stack at the loading zone. It it then important that each successive workpiece is gripped at the same point to ensure consistency in the positioning of the workpieces at the unloading station.

In conventional feed mechanisms of the above-described kind, the carrier means is pivotable upwardly and downwardly about a horizontal axis. Consequently, in order to ensure that each workpiece is gripped at the same position, it has been necessary to provide complicated machinery to push the stack of workpieces progressively upwardly so that the top workpiece in the stack is always at the same level for engagement by the carrier means. The complexity of this machinery increases not only the cost of the feed mechanism but also its liability to malfunction.

One solution to this problem has been to arrange for the workpieces to be fed one at a time through a constriction from the bottom of the stack. This solution is not practicable, however, where the workpieces have protuberances thereon or are otherwise not flat, since the protuberances will prevent the workpieces from being removed easily from the bottom of the stack.

It is an object of the present invention to obviate these difficulties.

According to the present invention, there is provided a feed mechanism comprising carrier means operable to grip a workpiece at the loading station and to support the workpiece during its transference to the unloading station, and a frame with respect to which the carrier means is horizontally movable through a predetermined distance to effect said transference of the workpiece, the carrier means also being movable vertically relative to the frame so that it can be raised or lowered vertically into engagement with the workpiece at the loading station.

In this manner, when the workpieces are stored in a stack at the loading station, or where the workpieces are of differing heights, the point of engagement of the carrier means with successive workpieces will always be the same relative to the direction of horizontal movement of the carrier means, and this will ensure that each workpiece is correctly deposited at the unloading station regardless of the height of the workpiece or its position in the stack. Moreover, the feed mechanism of the invention can easily deal with a stack of workpieces which are not completely flat or which are of an awkward shape. Furthermore, the horizontal travel of the carrier means can be limited by fixed stops, so that the feed mechanism is easily set and its operation is very accurate. In addition, it is necessary to make only minimum modifications to an existing machine tool to fit the feed mechanism thereto, and the only additional equipment required is a plate with vertical locations thereon for fitting to the bed of the machine tool. Moreover, a finished component produced from the workpiece can be arranged to be ejected from the machine tool by the forward movement of the carrier means when transporting the next successive workpiece thereto.

Also according to the present invention, there is provided a feed mechanism comprising a frame, carrier means operable to grip a workpiece at the loading station and to support the workpiece during its transference to the unloading station, the carrier means being mounted on the frame for horizontal movement relative thereto, moving means operable to move the carrier means upwardly and downwardly relative to the frame, and a cam mechanism for controlling operation of the moving means, the cam mechanism including a movable cam and a cam follower which is arranged to cause energisation or de-energisation of the moving means as it moves onto or off a predetermined portion of the cam.

The feed mechanism advantageously also comprises a slide which is movable rectilinearly relative to the frame, the carrier means being mounted on the slide for horizontal movement therewith relative to the frame and being movable upwardly and downwardly relative thereto. Alternatively, however, the carrier means can be pivotable relative to the frame about a vertical pivot axis.

Embodiments of the present invention will now be described, by way of example, with reference to the accompanying drawings, in which:

FIG. 4 is a side view of a driven cam mechanism which forms part of the feed mechanism of FIGS. 1 to 3;

FIG. 5 is a side view of an actuator device which also forms part of the feed mechanism of FIGS. 1 to 3;

FIG. 6 is a plan view of an actuator assembly which forms a further part of the feed mechanism of FIGS. 1 to 3;

FIG. 7 is a view in the direction of arrow VII in FIGS. 1 and 2 of a stripping mechanism;

FIG. 8 is a side view of an interlock mechanism which forms part of the feed mechanism of FIGS. 1 to 3, but which is not shown therein for convenience;

FIG. 9 is a view in the direction of arrow IX in FIG. 2 of a detection device;

FIG. 10 is a section along the line X—X in FIG. 9;

FIG. 11 is a schematic plan view of a feed mechanism according to an alternative embodiment of the invention; and FIGS. 12, 13 and 14 show respectively three forms of carrier device which can be used in the feed mechanism of FIGS. 1 to 3 and FIG. 11.

Figure 1:
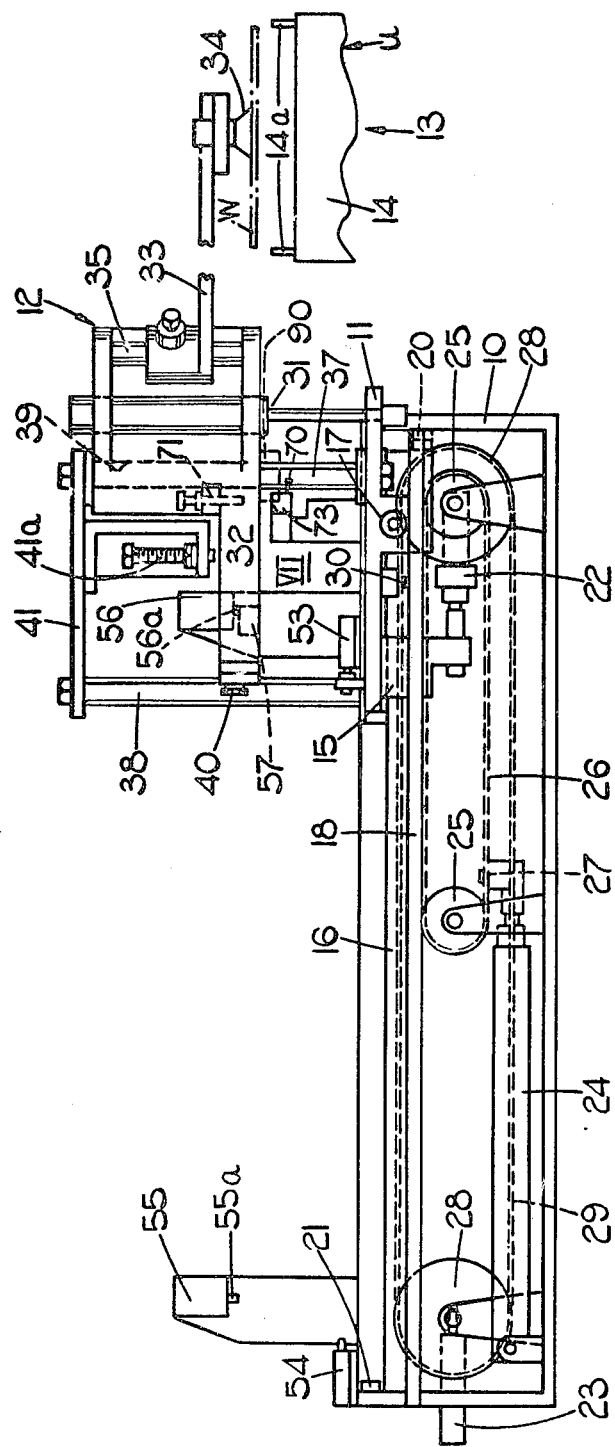
FIG. 1 is a side elevation of a feed mechanism according to one embodiment of the present invention.
Figure 2:
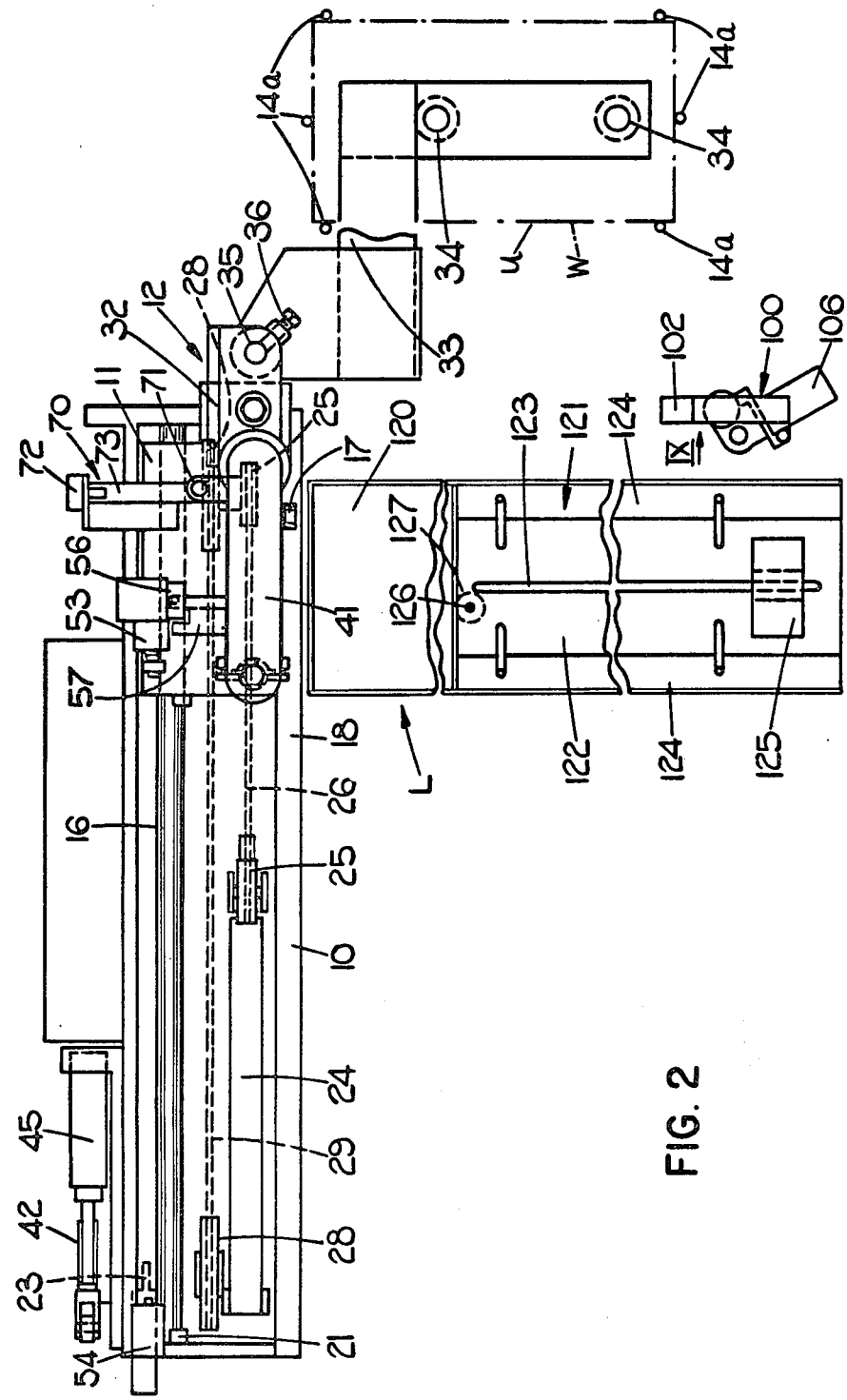
FIG. 2 is a sectional plan view of the feed mechanism shown in FIG. 1.
Figure 3:
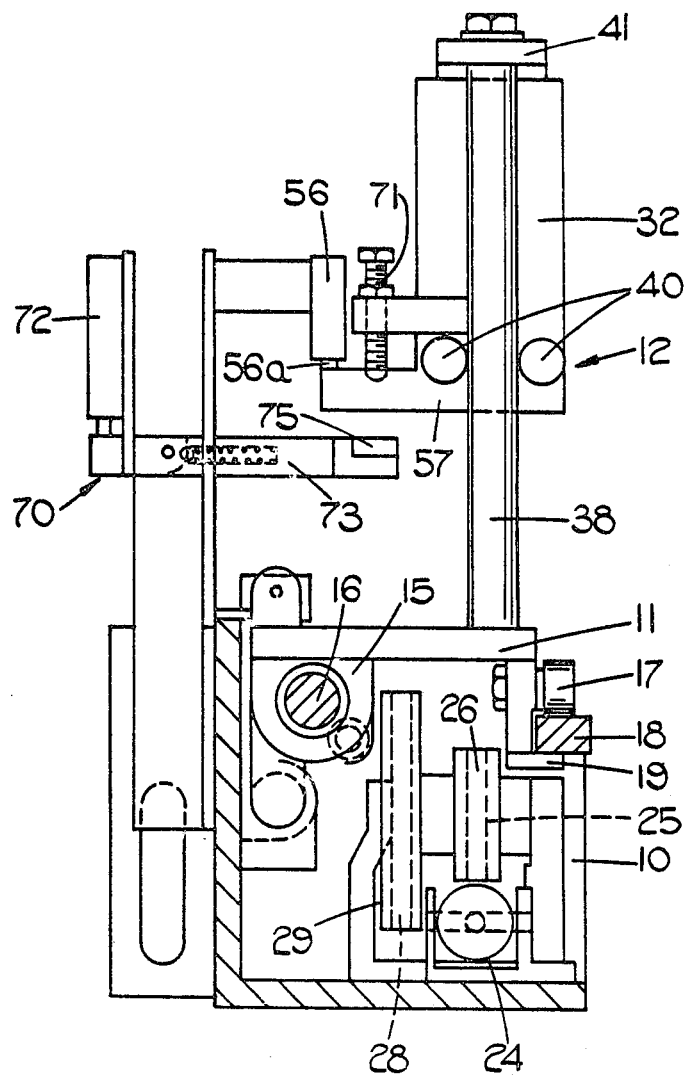
FIG. 3 is an end view of the feed mechanism shown in FIGS. 1 and 2.

Referring first to FIGS. 1 to 3, the feed mechanism illustrated therein is designed to transfer stacked workpieces singly from a loading zone L to an unloading zone U, and comprises generally an elongate frame 10, a slide 11 which is movable rectilinearly and horizontally relative to the frame 10, and a carrier 12 which is mounted on the slide 11 for horizontal movement therewith relative to the frame 10. In use, the frame 10 is attached to a bed 13 of a press, the unloading zone U being defined by a lower press tool of the press (illustrated diagrammatically at 14).

The slide 11 is constrained to move towards and away from the press by means of a collar 15 on the slide 11 which is slidable along a guide 16 extending longitudinally of the frame 10. As can be seen in FIG. 3, the collar 16 is disposed to one side of the slide 11, the other side thereof being supported by a roller 17 which runs along the upper surface of a track 18 on the frame 10. A retaining plate 19 on the slide 11 locates beneath the track 18 to prevent the roller 17 from lifting off the latter. Stops 20 and 21 are provided at either end of the frame 10 to limit movement of the slide 11 respectively towards and away from the press, and buffers or dampers 22 and 23 are positioned on the frame 10 to engage the slide 11 when it abuts against the stops 20 and 21 respectively.

The slide 11 is reciprocated towards and away from the press by means of a double-acting piston and cylinder assembly 24. A piston rod of the assembly 24 is coupled to the slide 11 by way of a mechanism which causes the slide 11 to move through approximately twice the distance moved by the piston rod.

This mechanism comprises a pair of sprocket wheels 25 around which is passed an endless chain 26, the piston rod being secured to the lower run of the chain 26 at a point 27. Rotatable with and about the same axis as one of the sprocket wheels 25 is one of a pair of larger diameter sprocket wheels 28. An endless chain 29 is looped around the sprocket wheels 28, and has the slide 11 secured to its upper run at a point 30. The sprocket wheels in each pair are spaced apart in the direction of reciprocation of the slide 11, the spacing between the sprocket wheels 28 being approximately twice that between the wheels 25. In the illustrated embodiment, the sprocket wheels 25 and 28 have eleven and twenty-three teeth, respectively.

The carrier 12 is mounted on the slide 11 for vertical movement relative thereto, such movement being effected by means of a pneumatic piston and cylinder assembly 31 mounted on the carrier. The carrier 12 comprises a body 32, an arm 33 extending forwardly and to one side of the body 32, and one or more carrier devices 34 mounted on the forward end of the arm 33. In the illustrated embodiment, two such carrier devices are provided. The body 32 includes a vertical guide 35 along which the arm 33 is slidable for adjustment of the vertical position of the carrier device 34, and a bolt 36 is provided for securing the arm 33 to the guide 35 at the appropriate position.

The carrier 12 is constrained to move vertically relative to the slide 11 by means of a pillar 37 and a guide 38 on the latter, the pillar 37 passing through a bore 39 in the body 32 and the guide 38 being engaged on opposite sides thereof by respective rollers 40 carried by the rear end of the body 32. A cross-member 41 interconnects the upper ends of the pillar 37 and the guide 38 to impart rigidity thereto. A bolt 41a carried by the cross-member 41 is disposed in the path of upward movement of the carrier body 32, and is adjustable to determine the raised position of the carrier 12.

Operation of the piston and cylinder assembly 31 is controlled by a driven cam mechanism which is shown in detail in FIG. 4. The cam mechanism includes a rotatable cam 42 having a sector-shaped portion 43 whose circumferential ends are chamfered and an arm portion 44 which is pivotally connected to a piston rod of a double-acting piston and cylinder 45. The cam 42 is rotatable about the centre of curvature of the sector-shaped portion 43, the angular extent of this rotation being limited by a pair of bolts 46 and 47 which are disposed in the path of the arm portion 44. Additional bolt holes 48 and 49 are provided in the frame 10 adjacent the bolts 46 and 47 respectively, and the purpose of these holes will be described later.

A cam follower, comprising a roller 50 on the end of a pivotable arm 51, is carried by the frame 10 and is disposed in the path of the cam 42. The arm 51 is arranged to actuate an actuator device 52 when the roller 50 engages the sector-shaped portion 43. As will be explained in detail later, the device 52 when so actuated de-pressurises the piston and cylinder assembly 31 so as to cause the carrier 12 to descend. When the device 52 is de-actuated, pressurised air is supplied to the piston and cylinder assembly 31 so as to raise the carrier 12.

Operation of the piston and cylinder assembly 45 is controlled by a pair of actuator devices 53 and 54 mounted on the frame 10 for engagement with the slide 11. Actuator device 53 is arranged to be operated as the slide 11 moves into its extreme forward position (i.e. into engagement with the stop 20), and actuator device 54 is arranged to be operated as the slide moves into its extreme rearward position (i.e. into engagement with the stop 21). The detailed operation of this arrangement will be described later.

Operation of the piston and cylinder assembly 24, which reciprocates the slide 11, is controlled by two actuator devices 55 and 56 which are disposed so as to be operable by an actuator assembly 57 extending sidewards from the body 32 of the carrier. The actuator device 55 is shown in detail in FIG. 5, it being understood that the actuator device 56 is similar thereto, and the actuator assembly 57 is shown in detail in FIG. 6.

The actuator assembly 57 comprises a first arm 58 mounted on the body 32 of the carrier 12 for pivotal movement about a vertical pivot 59, and a second arm 60 mounted on the arm 58 for pivotal movement relative thereto about a vertical pivot 61. The arm 58 is biassed anticlockwise (as viewed in FIG. 6) by a spring 62, but rotation thereof under this bias is limited by engagement of a shoulder 63 on the arm 58 with an abutment 64 on the carrier body 32. The arm 60 is biassed clockwise relative to the arm 58 by a spring 65 interposed therebetween, but rotation thereof under this bias is limited by engagement of an abutment 66 on the arm 60 with a shoulder 67 on the arm 58. The manner in which this arrangement operates will be described later.

Disposed alongside the slide 11 is a stripping mechanism 70 which is operable by an abutment, in the form of a bolt 71 in screw-threaded engagement with the body 32 of the carrier 12, to cause a workpiece to be released or stripped from the carrier devices 34. The stripping mechanism 70 is shown to advantage in FIG. 7 and comprises an actuator device 72 which is fixed relative to the frame 10, a lever 73 which is pivotable relative to the frame 10 about a pivot 74, and an abutment surface 75 on the lever 73. The abutment surface 75 is positioned so as to be engaged by the lower end of the bolt 71 when the slide 11 is in its extreme forward position and the carrier 12 is descending. The point during the descent of the carrier 12 at which the surface 75 is thus engaged can be adjusted by adjusting the bolt 71 relative to the body 32 or by adjusting the height of the mechanism 70 relative to the frame 10, thereby giving a measure of control on the level at which the workpiece is released. Engagement of the bolt 71 with the surface 75 causes the lever 73 to rotate about the pivot 74 and operate the actuator device 72, thereby causing stripping of the workpiece from the carrier devices 34. The lever 73 incorporates a safety breakaway device, indicated generally at 76, which prevents the actuator device 72 from being damaged in the event that the forward end of the carrier arm 33 is caught under the upper press tool as the press is operated.

The operation of the feed mechanism thus far described is as follows. It will be assumed that the slide 11 is initially positioned at its extreme forward position, so that an operator can stack workpieces at the loading station L. This action is assisted by the carrier devices 34 being offset from the centreline of the slide 11. The piston and cylinder assembly 24 is then pressurised so as to move the slide 11 rearwardly into engagement with the stop 21 and the buffer 23.

As the slide 11 reaches its extreme rearward position, it operates the actuator device 54 so as to pressurise the piston and cylinder assembly 45 and thereby rotate the cam 42. Initially, the portion 43 of the cam is engaged with the bolt 47, and pressurisation of the assembly 45 causes the cam 42 to rotate anticlockwise, as viewed in FIG. 4.

The roller 50 then rides onto one circumferential end of the sector-shaped portion 43, causing the lever 51 to pivot and actuate the actuator device 52. This in turn causes depressurisation of the piston and cylinder assembly 31, and the carrier 12 descends until the carrier devices 34 come into engagement with the uppermost workpiece in the stack at the loading station L and grip same.

Also as the slide 11 moves into its extreme rearward position, the arm 58 of the actuator assembly 57 engages the side of an operating pin 55a of the actuator device 55 and is turned clockwise (as viewed in FIG. 6) about the pivot 59 thereby. During the subsequent lowering of the carrier 12, the arm 58 springs back to its initial position as soon as it cleans the lower end of the operating pin 55a. The actuator device 55 is thus not operated at this stage, but the arm 58 is now in a position to depress the pin 55a when the carrier 12 is subsequently raised.

During the descent of the carrier 12, the cam 42 continues its anticlockwise rotation. The rate of rotation of the cam 42 is so arranged relative to the rate of descent of the carrier 12 that the roller 50 rides off the other circumferential end of the sector-shaped portion 43 only after the carrier devices 34 have engaged the uppermost workpiece. Such riding off of the roller 50 causes the lever 51 to pivot and de-actuate the actuator device 52, thereby re-pressurising the piston and cylinder assembly 31 and raising the carrier 12. Rotation of the cam 42 is halted when the arm portion 44 engages the bolt 46, whereupon the cam mechanism occupies the position shown in FIG. 4.

As the carrier 12 moves into its uppermost position (wherein further upward movement thereof is prevented by engagement of the body 32 with the bolt 41a), the arm 58 of the actuator assembly 57 engages and depresses the operating pin 55a of the actuator device 55. This in turn causes pressurisation of the piston and cylinder assembly 24 in the reverse direction, so that the slide 11 is advanced to its extreme forward position. It will be manifest that the carrier 12 remains in its raised position during advancement of the slide 11.

As the slide 11 moves into its extreme forward position, it operates the actuator device 53 causing the piston and cylinder assembly 45 to rotate the cam 42 clockwise, as viewed in FIG. 4. When the roller 50 rides onto the leading circumferential end of the sector-shaped portion 43, the lever 51 pivots so as to actuate the actuator device 52. This causes the piston and cylinder assembly 31 to be depressurised once again, as a result of which the carrier 12 moves downwardly.

Also as the slide 11 moves into its extreme forward position, the arm 60 of the actuator assembly 57 engages the side of an operating pin 56a of the actuator device 56 and is turned anticlockwise (as viewed in FIG. 6) about the pivot 61 thereby. During the subsequent lowering of the carrier 12, the arm 60 springs back to its original position as soon as it clears the lower end of the pin 56a. The actuator device 56 is thus not operated at this time, but the arm 60 is now in a position to depress the operating pin 56a when the carrier 12 is subsequently raised.

After the piston and cylinder assembly 31 has been depressurised, the carrier 12 descends until the bolt 71 thereon engages the abutment surface 75 of the stripping mechanism 70, whereupon the actuator device 72 is operated to release the workpiece from the carrier devices 34 onto the press tool 14.

The press tool 14 is advantageously provided with location pins 14a for locating the workpiece correctly thereon. The stripping mechanism 70 is then adjusted so that the workpiece is not released from the carrier devices 34 until it is at a level below the upper ends of these pins 14a. In this way, correct location of the work piece on the press tool 14 is ensured. Also, in the event that the workpiece is mis-located on the press tool 14, it will engage the upper ends of the location pins 14a and prevent the carrier 12 from descending fully. This in turn will prevent the bolt 71 from moving sufficiently far downwardly to actuate the stripping mechanism 70, so that the workpiece is not released from the carrier devices 34.

When the roller 50 rides off the sector-shaped portion 43 of the cam 42, the actuator device 52 is de-actuated and the piston and cylinder assembly 31 is re-pressurised so as to raise the carrier 12. The cam 42 continues to rotate until the portion 43 thereof engages the bolt 47. As the carrier 12 reaches its uppermost position, the arm 60 of the actuator assembly 57 engages and depresses the operating pin 56a of the actuator device 56, thereby causing the piston and cylinder assembly 24 to be pressurised so as to move the slide 11 back into its extreme rearward position. The cycle of operation then repeats.

During the return stroke of the slide 11, the press is operated to perform a pressing or the like operation on the workpiece. The pressed workpiece is ejected from the press by a leading end of the carrier arm 33 during the following forward stroke of the feed mechanism.

In order to ensure that the upper press tool of the press cannot descend to perform a pressing operation on a workpiece while the arm 33 is in its forward position, an interlock mechanism (shown in FIG. 8) is provided. The interlock mechanism comprises a stand 80 mounted on the bed 13 of the press, and a support 81 which is mounted on the stand 80 and which is vertically adjustable relative thereto by means of a bolt 82 on the support 81 engaging in an elongate slot 83 in the stand 80. A bell crank lever 84 is pivotably mounted on an upper end of the support 81 and carries rollers 85 and 86 on its arms, respectively. The roller 85 engages a member 87 which is movable vertically with a ram of the press, and the roller 86 engages a forward end of the arm 33. Thus, in the event that the arm 33 is not retracted from the press when the upper press tool commences its descent, the member 87 bears against the roller 85 and pivots the lever 84 so that the roller 86 pushes the arm 33 out of the way. The force exerted on the arm 33 in this manner is arranged to be sufficient to overcome the pneumatic pressure in the piston and cylinder assembly 24.

In the mode of operation described above, the carrier 12 is lowered and raised again in both the extreme forward and extreme rearward positions of the slide 11. The operation of the feed mechanism can, however, be modified according to the function it is to perform so that the carrier 12 is raised only when the slide 11 is in its extreme forward position and is lowered only when the slide 11 is in its extreme rearward position. In this form, the feed mechanism is suitable, for example, for advancing a length of strip through the press in stages, the strip being advanced during each forward stroke of the carrier 12 in its lowered position, or for feeding cup-shaped workpieces where it is necessary to lower the carrier devices into the workpiece at the loading zone and raise the carrier devices out of the workpiece at the unloading zone.

Such operation of the feed mechanism is achieved by (1) moving the bolt 46 into the bolt hole 48, (2) fitting a collar 90 (shown in broken line in FIG. 1) to the bottom of the carrier body 32 so as to be slidable on the pillar 37 with the carrier, (3) securing a bracket 91 (shown in broken lines in FIGS. 5 and 6) to the rearward-facing side of the arm 58 of the actuator assembly 57, and (4) pivotally mounting a bracket 92 (shown in broken lines in FIG. 5) on the frame 10 in the vicinity of the actuator device 55. A bolt 93 is used to mount the bracket 92 in this way, and the bracket 92 has one end 94 thereof disposed for engagement with the operating pin 55a, the other end thereof having a bolt 95 adjustably mounted thereon for engagement with the bracket 91.

When the slide 11 reaches its extreme rearward position with the carrier 12 in its raised position, the actuator device 54 is operated as before to rotate the cam 42 anticlockwise, as viewed in FIG. 4. Also as before, the piston and cylinder assembly 31 is depressurised to lower the carrier 12 when the roller 50 rides onto one end of the sector-shaped cam portion 43. However, the roller 50 is now unable to ride off the other end of the cam portion 43 because the re-positioned bolt 46 prevents the cam from rotating sufficiently far for this to happen. The piston and cylinder assembly 31 thus remains de-pressurised for the time being.

As the carrier 12 descends, the bolt 95 is engaged by the bracket 91 on the actuator assembly 57, and the bracket 92 is thereby pivoted so as to depress the operating pin 55a of the actuator device 55. This in turn causes pressurisation of the piston and cylinder assembly 24 to move the slide 11 forwardly. During such forward movement of the slide 11, the carrier 12 remains in its lowered position because of the continued depressurisation of the piston and cylinder assembly 31.

As the slide 11 reaches its extreme forward position, the actuator device 53 is operated to cause the cam 42 to rotate clockwise, as viewed in FIG. 4. The roller 50 is now able to ride off the same end of the cam portion 43 as it previously rode onto, thereby causing pressurisation of the piston and cylinder assembly 31 to raise the carrier 12. When the carrier 12 reaches its uppermost position, the actuator device 56 is operated as before to return the slide 11 to its extreme rearward position, whereupon the cycle of operations is repeated.

The operation of the feed mechanism can also be modified so that the carrier 12 is raised only when the slide 11 is in its extreme rearward position and is lowered only when the slide 11 is in its extreme forward position. In this form, the feed mechanism is particularly suited to the feeding of workpieces which are flanged at or adjacent their tops, in which case a carrier device (which may consist merely of a plate having a slot therein which opens onto the forward end of the plate) is engaged with the workpiece from below so that the workpiece is supported thereon by its flange, and is disengaged therefrom by lowering the carrier device beyond the point where the workpiece comes to rest on the lower press tool.

Such operation of the feed mechanism is achieved by (1) moving the bolt 47 into the bolt hole 49, the bolt 46 being in the position shown in FIG. 4 at this time, (2) fitting the collar 90 to the carrier body 32, as before, (3) securing the bracket 91 to the actuating assembly 57, again as before, and (4) mounting the bracket 92 adjacent the actuator device 56 rather than the actuator device 55.

When the cam 42 is rotated at the forward end of the slide travel, the roller 50 is unable to ride off the sector-shaped portion 43. The piston and cylinder assembly 31 is thus held in a de-pressurised state during the rearward stroke of the slide, and is re-pressurised only when the cam 42 is rotated in the reverse direction at the rearward end of the slide travel.

By the above-described simple alterations, the feed mechanism is given great versatility in its manner of operation with a minimum of modification.

Where the carrier 12 is lowered into engagement with a stack of workpieces at the loading station L, it may happen that two or more workpieces are inadvertently picked up together (because, for example, they have become stuck together by grease). In order to prevent more than one workpiece being inadvertently transferred to the press at one time, a device 100 is provided for detecting the correct operation of the feed mechanism.

The detection device 100 is shown to advantage in FIGS. 2 and 9, and includes a base 101 mounted on the frame 10, a pair of jaws 102 carried by an arm 103 which is pivotable relative to the base 101 about a vertical pivot 104 and a horizontal pivot 105, and an actuator device 106 which is arranged to be actuated by pivotal movement of the arm 103 relative to the base 101 about the vertical pivot 104. The actuator device 106 includes a pivotable actuating arm 107 having a roller 108 at one end, the roller 108 engaging a cam 109 which is pivotable about the vertical pivot 104 with the jaws 102. The cam 109 includes a cut-out portion 110 (see FIG. 10) in which the roller 108 normally engages, pivotal movement of the arm 103 relative to the base 101 about the vertical pivot 104 causing the roller 108 to ride out of the cut-out portion 110 and pivot the actuating arm 107 so as to operate the device 106. Operation of the device 106 automatically arrests the slide 11.

The jaws 102 are disposed so that the workpieces must pass therebetween as they are moved from the loading station L to the unloading station U at the press. The jaws 102 have a predetermined clearance therebetween which is set to slightly less than two workpiece thicknesses. The jaws are each pivotable relative to the arm 103 about a respective horizontal axis perpendicular to the direction of movement of the workpiece, and are each provided with a chamfered leading edge so as to provide a lead in for the workpiece. The upper jaw 102 is disposed in the path of movement of the workpieces so that the latter will contact the upper jaw during forward movement of the slide 11. However, the chamfered leading edge and the pivotal mounting of the upper jaw enable it to pivot and allow the workpiece to pass thereby without operating the actuator device 106. In addition, the play between the jaws 102 caused by their pivotal mounting allows distorted workpieces to pass therebetween without operating the actuator device.

In use, if more than one workpiece is inadvertently picked up by the carrier, they will collide with the jaws 102 and, being unable to pass therebetween, will cause the jaws to pivot relative to the base 101 and operate the actuator device 106 so as to stop operation of the feed mechanism. If, on the other hand, only one workpiece is picked up by the carrier but is not successfully released therefrom at the unloading station, the workpiece will collide with the non-chamfered edge of the upper jaw as the carrier moves back to the loading station and, being unable to pass therebetween, will pivot the jaws in the opposite direction relative to the base 101, thereby operating the device 106 and arresting the slide. This effect can be enhanced by balancing the arm 103 so that it it normally tilted about the horizontal pivot 105.

Where stacked workpieces are being transferred singly to the press, the stack is held in a magazine 120 (see FIG. 2) at the loading station L. During the transference of the workpieces to the press, it may be necessary to add further workpieces to the top of the stack and a loader 121 is provided which enables this to be done while the feed mechanism is still in operation.

The loader 121 comprises a base plate 122 having a slot 123 therein which extends towards the magazine 120, and a pair of parallel side rails 124 which are adjustably mounted on the base plate 122 so that their lateral spacing can be altered to accommodate workpieces of different sizes. A block 125 is slidable along the slot 123 towards and away from the magazine 120, and disposed at the end of the slot 123 adjacent the magazine in a pin 126 which can be extended above the upper surface of the base plate 122 by operation of a piston and cylinder unit 127. Operation of the unit 127 is, in fact, synchronised with the operation of the feed mechanism, so that the pin 126 is extended when the carrier device 34 is disposed at the loading station to prevent additional workpieces from being loaded in the magazine at that time. As soon as the carrier device 34 has moved away from the magazine, the pin 126 is retracted.

In order to place additional workpieces in the magazine, the workpieces are first placed on the base plate 122 between the block 125 and the pin 126, and the block 125 is then moved towards the magazine. The block 125 can be moved manually, or by means of a piston and cylinder unit (not shown) whose operation is synchronised with the operation of the feed mechanism. In the latter case, the pin 126 and piston and cylinder unit 127 can be dispensed with.

When handling large workpieces, it may be necessary to use more than, say, two carrier devices 34 on the carrier 12. In order to ensure adequate support for the workpiece, a pair of feed mechanisms of the type described above operating in parallel can be used, the carrier devices being mounted on a support which interconnects the forward ends of the carrier arms 33, and the feed mechanism being disposed on either side of a line connecting the loading and unloading zones.

In the arrangements described above, the carrier 12 is mounted on a slide 11 which is movable rectilinearly relative to the frame 10. In an alternative embodiment, however, the carrier 12 is pivotable relative to the frame 10 about a vertical axis. A feed mechanism according to this alternative embodiment is shown in FIG. 11, wherein those parts which are common to the previously described embodiment are denoted by the same reference numerals.

In the feed mechanism of FIG. 11, the carrier 12 is pivotable about the pillar 37 which is mounted directly on the frame 10. The slide 11 has thus been dispensed with. A part of the carrier body 32 which is disposed on one side of the pillar 37 operates the actuator devices 53, 54 and has the actuator assembly 37 mounted thereon. The carrier arm 33 is disposed on the opposite side of the pillar 37 so that the carrier device 34 has a clear sweep between the loading and unloading stations. The piston and cylinder assembly 24 is now pivotally mounted on the frame 10 and drives the carrier 12 directly along its pivotal path.

A variety of carrier devices 34 can be used in the feed mechanism described above, one form of the carrier device having already been described above. Three other forms of carrier devices are illustrated in FIGS. 12, 13 and 14.

The carrier device shown in FIG. 12 is of a magnetic type, and comprises a housing 130 which is mounted on the end of the carrier arm 33, and one or more magnets 131 secured to the arm 33 by a bolt 132 and spaced therefrom by a spacer 133 which surrounds the bolt 132. Thus housing 130 defines a cylinder therein which a hollow piston 134 made of non-magnetic material is slidably disposed. The piston 134 surrounds the magnet 131 and a spring 135 is located between the piston 134 and the magnet 131 so as to urge the piston 134 into a position in which it is retracted within the housing 130 and in which it does not project beyond the magnet 131. A small clearance is provided between the outer periphery of the magnet 131 and the piston 134 to enable the magnet to tilt slightly relative to the housing 130, thereby ensuring that the full contact area of the magnet is used where the workpiece is distorted.

When the carrier device reaches the loading zone L, it is in the condition shown in FIG. 12, wherein the piston 134 is retracted. The magnet 131 is thus able to engage the uppermost workpiece W on the stack and hold the same on the carrier device. The workpiece will, of course, in this case be made of magnetisable material.

When the carrier device reaches the unloading zone U, pressurised air is supplied via a port 136 to the space above the piston 134 so as to move the piston downwardly against the action of the spring 135. This brings the piston 134 into engagement with the workpiece, whereupon further downward movement of the piston 134 disengages the workpiece from the magnet 131, thereby releasing the workpiece W from the carrier device onto the press tool 14. The space above the piston 134 is then exhausted to permit the piston to retract into the housing 130 under the action of the spring 135.

In an alternative embodiment (not illustrated), the or each magnet is provided with a downwardly extending projection for locating in an opening or recess in the workpiece where the workpiece is suitably shaped.

The carrier device illustrated in FIG. 12 is particularly useful where more than one magnet 131 is used. Where only one such magnet is provided, a carrier device of the form shown in FIG. 13 is more advantageously utilized. The carrier device comprises a hollow body 140 within which a non-magnetic piston 141 is slidable, a stem 142 of the piston extending slidably through a central hole in a magnet 143. The magnet 143 is loosely fitted in a recess 144 in the body 140 and is retained therein by means of bolts 145 on the body 140 which engage a flange 146 on the magnet 143. The magnet 143 is thus able to tilt relative to the body 140 to compensate for any distortion of the workpiece, as before. The workpiece can be disengaged from the magnet by introducing pressurised air through a port 147 into the space above the piston 141, thereby moving the piston 141 downwardly relative to the magnet 143.

The carrier device illustrated in FIG. 14 can be used to carry certain workpieces of non-flat configuration, and comprises a plate 150 in which a hole 151 is provided and an arm 152 pivotally mounted on the plate 150 and biassed towards the hole 151 by a torsion spring 153. In use, a part of the workpiece is received within the hole 151 while the arm 152 is held away therefrom by a pin 154 (shown in broken lines) at the loading zone. Upon movement of the carrier means away from the loading zone, the arm 152 is urged by the spring 153 into engagement with said part of the workpiece so that the latter is gripped between the arm 152 and an opposed edge of the hole 151. Release of the workpiece from the carrier device is performed by a pin 155 (also shown in broken line) at the unloading zone which engages the arm 152 to pivot the latter away from the hole 151. For this carrier device, the feed mechanism is set as described above so that the carrier is raised only when the slide is in its extreme forward position and is lowered only when the slide is in its extreme rearward position.

As an alternative to the above-described forms of carrier device, a suction-type device (not illustrated) can be used which comprises a cup engageable with the workpiece and means for applying a vacuum to the cup so as to hold the workpiece thereon. When the carrier device reaches the unloading station, the vacuum is temporarily released from the cup and a blast of air is passed therethrough. Not only does the blast of air assist in the release of the workpiece from the cup, but also clears the cup of any dirt or the like which may have been taken up from the workpiece.

I claim:

1. A feed mechanism for transferring workpieces from a loading station to an unloading station, comprising:

a frame;

carrier means mounted on said frame for horizontal movement relative thereto and operative to grip a workpiece during its transference from the loading station to the unloading station;

moving means operative to move said carrier means upwardly and downwardly with respect to said frame; a detection device mounted on said frame and including a pair of jaws having a predetermined clearance therebetween, said pair of jaws being disposed so that the workpiece must pass through said predetermined clearance when being transferred to the unloading station; and actuating means operative to arrest horizontal movement of said carrier means with respect to said frame in the event that the workpiece collides with said pair of jaws.

2. The feed mechanism according to claim 1, wherein said detection device also includes a base on which said pair of jaws are pivotally mounted, and a cam mounted for pivotal movement with said pair of jaws relative to said base, and said actuating means includes an actuating member engaged with said cam and actuable when said cam pivots relative to said base.

3. The feed mechanism according to claim 1 wherein at least one of said pair of jaws is disposed in the path of movement of said workpiece, said at least one of said jaws being pivotable about an axis perpendicular to the direction of movement of said workpiece and having a chamfered leading edge.

4. The feed mechanism according to claim 3, wherein both of said jaws are pivotable about respective axes perpendicular to the direction of movement of said workpiece and have respective chamfered leading edges.

5. A feed mechanism for transferring workpieces from a loading station to an unloading station, comprising:

a frame;

carrier means movable horizontally with respect to said frame between a first position which corresponds to the loading station and a second position which corresponds to the unloading station, said carrier means being operative to grip a workpiece during its transference from the loading station to the unloading station;

moving means operative to move said carrier means rectilinearly in a vertical direction with respect to said frame; detection means operative to detect movement of said carrier means into either of said first and second positions; and a cam mechanism operative to control operation of said moving means, said cam mechanism including a movable cam having a predetermined portion and a cam follower, said cam being moved in response to said detection by said detection means and said cam follower causing energisation or de-energisation of said moving means as said cam follower moves onto or off said predetermined portion of said cam.

6. The feed mechanism according to claim 5, wherein said cam is reciprocable, and has a stop means associated therewith which can be positioned so as to limit movement of said cam in one direction or the other, thereby to prevent said cam follower from moving beyond said predetermined portion of said cam.

7. A feed mechanism for transferring workpieces from a loading station to an unloading station, comprising:

a frame;

carrier means movable horizontally with respect to said frame between a first position which corresponds to the loading station and a second position which corresponds to the unloading station, said carrier means being operable to grip a workpiece during its transference from the loading station to the unloading station; first moving means operative to move said carrier means upwardly and downwardly with respect to said frame; detection means operative to detect movement of said carrier means into either of said first and second positions;

a cam mechanism operative to control operation of said first moving means, said cam mechanism including a reciprocable cam having a predetermined portion, a cam follower and second moving means, said second moving means being operative to move said cam in one direction or the other in response to said detection by said detection means and said cam follower causing energisation or de-energisation of said first moving means as said cam follower moves onto or off said predetermined portion of said cam; and stop means which can be positioned to limit selectively the movement of said cam to control whether or not said cam follower can move beyond said predetermined portion of said cam.

8. A feed mechanism for transferring workpieces from a loading station to an unloading station, comprising:

a frame;

carrier means mounted on said frame for horizontal movement relative thereto and operative to grip a workpiece during its transference from the loading station to the unloading station; moving means operative to move said carrier means upwardly and downwardly with respect to said frame; a pair of actuator devices operable by depression of respective actuator pins to control operation of said moving means; and actuating means for operating said actuator devices as said carrier means is moved into one of a raised and lowered position at a respective end of its horizontal travel, said actuating means including first and second arms pivotably mounted on said carrier means, said first arm being biassed towards a position in which it can depress said actuator pin of one of said actuator devices when said carrier means is at a respective end of its horizontal travel, said second arm being biassed towards a position in which it can depress said actuator pin of the other of said actuator devices when said carrier means is at the other end of its horizontal travel, each said arm being arranged to be pivoted against the action of its bias by engagement with the respective actuator pin when said carrier means moves into the respective end of its horizontal travel in said one of its raised and lowered positions.

9. The feed mechanism according to claim 8, further comprising a bracket which can be pivotably mounted on said frame for engagement with said actuator pin of one of said actuator devices, said bracket being engageable by said actuating means so as to depress said actuator pin when said carrier means moves into the other of said raised or lowered positions at the respective end of its horizontal travel.

* * * * *